(12) United States Patent
Hulek et al.

(10) Patent No.: US 6,250,109 B1
(45) Date of Patent: Jun. 26, 2001

(54) METHOD OF CONTINUOUSLY PRODUCING VITREOUS BLAST FURNACE SLAG

(75) Inventors: Anton Hulek, Linz; Franz Ritzberger; Rainer Wawrina, both of Leonding, all of (AT)

(73) Assignee: Voest-Alpine Industrial Services GmbH, Linz (AT)

( * ) Notice: Subject to any disclaimer, the term of this patent is extended or adjusted under 35 U.S.C. 154(b) by 0 days.

(21) Appl. No.: 09/180,888

(22) PCT Filed: May 15, 1997

(86) PCT No.: PCT/AT97/00101

§ 371 Date: Sep. 2, 1999

§ 102(e) Date: Sep. 2, 1999

(87) PCT Pub. No.: WO97/43455

PCT Pub. Date: Nov. 20, 1997

(30) Foreign Application Priority Data

May 15, 1996 (AT) ........................................... 868/96

(51) Int. Cl.⁷ ........................................................ C21B 3/08
(52) U.S. Cl. ................... 65/19; 65/29.18; 65/137; 65/163; 65/327; 65/356
(58) Field of Search ............................. 65/19, 137, 356, 65/29.18, 163, 327; 425/261, 443; 501/155

(56) References Cited

U.S. PATENT DOCUMENTS 4,090,882 * 5/1978 Rauschenfels ................... 106/99
4,297,119 * 10/1981 Ando et al. ........................ 65/141
4,299,610 * 11/1981 Ando et al. ........................ 65/19
4,350,326 * 9/1982 Fuji et al. ......................... 266/201
4,750,358 * 6/1988 Ring .................................. 73/216

FOREIGN PATENT DOCUMENTS 29 50 974  6/1981  (DE).
205 416   12/1986  (EP).

OTHER PUBLICATIONS

Patent Abstracts of Japan, vol. 002, No. 122 (C–024), Oct. 13, 1978, & JP 53 089899 A, Aug. 8, 1978.
Patent Abstracts of Japan, vol. 004, No. 144 (C–027), Oct. 11, 1980, & JP 55 094405 A, Jul. 17, 1980.
Patent Abstracts of Japan, vol. 008, No. 098(C–221),May 9, 1984 & JP 59 013004 A, Jan. 23, 1984.
Patent Abstracts of Japan, vol. 016, No. 411(C–0979), Aug. 31, 1992 & JP 04 139040 A, May 13, 1992.

* cited by examiner

Primary Examiner—James Derrington
(74) Attorney, Agent, or Firm—Pillsbury Winthrop LLP

(57) ABSTRACT

The invention relates to a process for continuously producing a glassy or vitrified blast furnace slag, in which the slag is applied onto a cooling roll or onto articulately interlinked cooling plates conducted as an endless conveyor belt over deflection pulleys and wherein cooling of the slag is effected dry, wherein the liquid slag is supplied to an intermediate storage and from that intermediate storage is continuously applied onto the cooling plate belt, or cooling roll, via a distributing channel in parallel strands at temperatures of above 1350° C., whereupon the cooled slag is thrown off and comminuted or granulated dry in a crusher. The invention, furthermore, relates to an arrangement for carrying out the process.

27 Claims, 2 Drawing Sheets

METHOD OF CONTINUOUSLY PRODUCING VITREOUS BLAST FURNACE SLAG

BACKGROUND OF THE INVENTION

1. Field of the Invention

The invention relates to a process for continuously producing a glassy or vitrified blast furnace slag, in which the slag is applied onto a cooling roll or onto articulately interlinked cooling plates conducted as an endless conveyor belt over deflection pulleys and wherein cooling of the slag is effected dry, as well as an arrangement for carrying out the process.

The invention, in particular, aims at providing an efficient process by which the subsequent dry granulation of blast furnace slag is feasible at operating costs as low as possible while saving the environment to the largest extent possible.

2. Prior Art

Usual processes for granulating blast furnace slag, for instance in view of further processing in the cement industry, at present are devised as wet processes. The liquid blast furnace slag is united with large amounts of water, thereby solidifying to glassy granulates. In doing so, the total heat content is destroyed and $SO_2$ and $H_2S$ are usually formed, wherein, to make things worse, sulphur-containing waste waters are formed, the disposal of which involves additional expenditures.

From DE 29 50 974 A, an arrangement for the production of a glassy or vitrified blast furnace slag is known, in which an endless conveyor belt is provided with cooling grooves extending on the external surface and narrowing towards the groove roots. Via a slag melt vessel, slag melt is filled into the cooling grooves and, after cooling and solidification, is ejected from the cooling grooves on a predetermined site by means of a scraper provided on the internal surface of the conveyor belt.

From AT B 380 490 an arrangement for recovering the sensible heat of dumpable hot material may be taken, such an arrangement being intended for cooling, in particular, liquid blast furnace slag while recovering the sensible heat.

The known arrangement comprises an endless conveyor belt conducted over at least two deflection pulleys and formed of articulately interlinked plates, on the upper half of which conveyor belt the hot material is applied, the empty lower half of the conveyor belt being conducted through a cooling zone. With such a dry cooling, the high cooling speed required for vitrification without involving the risk of subsequent crystallization or recrystallization usually cannot be readily realized. For that reason, such known arrangements are frequently operated primarily with a view to as complete a recovery of energy as possible during cooling, thus accepting subsequent crystallization or recrystallization.

The known arrangement is applicable, in particular, also for hot material that must be cooled while avoiding the access of air such as, for instance, in the dry quenching of coke.

The known arrangement comprises a plurality of cooling plates, the cooling plates in the upper half being appropriately heated and in the lower half cooperating with cooling devices, which may be formed, for instance, by cooling plates through which a coolant flows. Heat transfer in that arrangement is effected by radiation or by the immediate contact of the counter cooling plates of the conveyor belt with the cooling plates for the purpose of cooling the cooling plates of the conveyor belt. The cooling device may also be formed by consecutively arranged holler counter cooling plates, wherein the upper sides of such counter cooling plates may be designed as smooth sliding surfaces getting into contact with the cooling plates of the conveyor belt.

SUMMARY OF THE INVENTION

The invention especially aims at providing a process of the initially defined kind, in which an arrangement as basically represented in AT B 380 490 may be successfully employed for the rapid solidification of slags at high flow rates. It is to be feasible, in particular, to immediately form a cooled vitrified blast furnace slag suitable for subsequent further comminution or granulation in a dry manner and capable of being thrown off the cooling belt by simple means completely and without residues.

To solve this object, the process according to the invention essentially consists in that the liquid slag is supplied to an intermediate storage and from that intermediate storage is continuously applied onto the cooling plate belt via a distributing channel in parallel strands at temperatures of above 1350° C., whereupon the cooled slag is thrown off and comminuted or granulated dry in a crusher.

Due to the fact that the liquid slag is supplied to an intermediate storage and continuously charged onto the cooling plate belt from that intermediate storage via a distributing channel at temperatures of above 1350° C., continuous operation is rendered feasible, on the one hand, and the rheologic conditions required for attaining, by dry cooling, the cooling speeds necessary for the formation of a glassy or vitrified state of the material to be cooled are safeguarded, on the other hand. The application of slag onto the cooling roll, or the cooling plate belt, in parallel strands ensures a uniform, thin slag layer on the cooling roll or cooling plate belt, respectively. The numerous individual streams converge into a single broad thin strip. In this manner, it is ensured that extremely thin coatings of the cooling roll, or the cooling plates, are obtained over a large width, thereby safeguarding the high cooling speed required for the formation of a glassy state without any risk of recrystallization. By applying the liquid slag at temperatures of above 1350° C., uniform distribution without lump formation on the cooling plates is ensured. By realizing the process according to the invention on a cooling roll, or on an endless conveyor belt formed of articulately interlinked cooling plates, the simple control of the material properties and of the state of vitrification of the material to be cooled is feasible.

The cooled vitrified slag immediately after this may be crushed or granulated dry in a crusher in a simple manner such that, on the whole, there is the opportunity to granulate blast furnace slag dry at the lowest operating costs and with the slightest environmental impacts. Since no water is used in the granulation of slag, no formation of hydrogen sulphide and no relevant formation of sulphur dioxide will occur, either. Also the conventional problems involved in treating waste water are obviated. The extremely slight layer thickness causes the slag to rapidly solidify at least surfacially. Since solidified slag exhibits a substantially better thermal conductivity than liquid slag, rapid and efficient cooling may be obtained at only a slight layer thickness and by doing with short-structure apparatus.

Advantageously, the process according to the invention is carried out in that the layer thickness on the cooling roll, or the cooling plate belt, is adjusted to 1 to 15 mm and, preferably, 2 to 10 mm, that the liquid slag on the cooling plate belt is cooled by at least 300° C. at a cooling speed of above 10° C./s and that the cooled slag is thrown off at temperatures of above 600° C. By adjusting the layer thickness on the cooling plates to 1 to 15 mm and, preferably, 2 to 10 mm, it has become feasible to attain the necessary cooling speed with structurally simple means. By cooling the liquid slag on the cooling plate belt by at least 300° C. at a cooling speed of above 10° C./s, vitrification is safeguarded, on the one hand, and cooling to a temperature at which the speed of crystal growth starts to decrease substantially so as to avoid recrystallization is effected, on the other hand, wherein, by the cooled slag being thrown off at temperatures of above 600° C., it is ensured that a coherent slag strip can be thrown off and hence a complete and simple separation of the cooled material from the cooling plates is achieved. Additional cooling may cause a spontaneous disintegration of the cooled material due to internal stresses, which can be avoided by the throw-off temperature, i.e., at temperatures of above 600° C.

The process according to the invention advantageously is carried out in a manner that the liquid slag via the distributing channel is applied onto the cooling plate belt in a manner divided in parallel strands at distances of less than 300 mm and, preferably, 100 to 200 mm, thereby forming a thin slag layer over the total useful width.

In order to safeguard that the liquid slag will be uniformly applied onto the cooling plate belt, it is advantageously proceeded in a manner that the distributing channel is heated via at least one heating element, in particular a burner directed to the outlet opening, near the internal run-off edge and the slag is maintained at temperatures of above 1350° C. and, in particular, 1400° C. In this manner, local undercooling about solidification clusters is avoided such that rapid and homogenous cooling may be effected.

As already mentioned in the beginning, the use according to the invention, of a cooling roll or of articulately interconnected cooling plates conducted over deflection pulleys as an endless conveyor belt allows for simple process control. Advantageously, it is proceeded in a manner that the slag tap from the intermediate storage into the distributing channels is controlled as a function of the layer thickness of the slag on the cooling plates via a controllable closure means, in particular a stopper runoff. The layer thickness may be scanned by means of conventional sensors, thereby enabling the selection of a basic adjustment for the safe operation of the plant in compliance with the respective demands. Temperature measuring values or temperature difference measuring values may also be used as measures for the layer thickness, since cooling on the plate belt is proportional to the layer thickness. Further enhancement of the control and selection of the desired material properties may be realized in that the conveying speed of the cooling roll or cooling plates and/or the slag tap from the intermediate storage are controlled as a function of a value measured for the state of vitrification on the throw-off end of the cooling roll or cooling plates, respectively. The state of vitrification advantageously may be detected by means of an optical sensor for determining the transmission and/or reflection of the slag strip on the throw-off end of the cooling plates, thus altogether enabling precise controlling aimed at a high glass portion. The slag must have a glassy portion of at least 90 to 95% by weight, in particular for the production of cement, what is not readily feasible without any specific process control. By the control according to the invention, it is readily feasible to guarantee the granulation of blast furnace slag at a 90 to 100% glass portion at low structural expenditures. The high glass portion sought may be ensured by adjusting the cooling speed to values of between 10°/s and 20°/s.

In order to safeguard the slight layer thickness desired, it must be taken care that the cooling cylinder, or the cooling plates, retain uniform shapes despite the high temperature differences. To this end, the configuration advantageously is devised such that the cooling roll or plane cooling plates with grid-like grooves in the plate surface are used. In order to maintain a high temperature difference and, hence, ensure extremely rapid cooling under the formation of a high glass portion, it is advantageously proceeded in a manner that the cooling cylinder, or the cooling plates, in return run regions free of slag are cooled to temperatures of below 400° C. and, preferably, below 350° C. by radiation cooling and/or contact cooling and/or by spraying a coolant.

The essential prerequisite for the formation of the desired glass portion and the usability of a subsequently granulated blast furnace slag in the cement industry yet also resides in the observance of a certain basicity. In doing so, it is advantageously proceeded in that acidic additives such as, e.g., $SiO_2$ are charged into the intermediate storage as a function of the slag analysis in order to maintain the desired slag basicity.

Further enhancement of the quality of the slag granulates may be ensured in that sedimented pig iron is drawn off the intermediate storage via an additional tap provided below the slag tap.

In order to ensure, as mentioned in the beginning, the safe separation of the cooled slag strip from the surfaces of the plates, the process advantageously is conducted in a manner that the slag strip throw-off temperature is adjusted to between 700° C. and 800° C. In this manner, it is ensured that a coherent strip will be supplied to subsequent dry granulation, wherein it is feasible to recool a cooling roll surface, or cooling plate surface, free of residues by directly contacting cooled counter plates in cooling roll regions, or cooling plate belt regions, free of slag. Temperatures of from 800 to 1000° C. likewise result in a readily separable coherent slag strip, yet subsequent cooling must continue to occur rapidly in order to avoid the risk of recrystallization. In addition, a still plastic strip can be comminuted only at increased expenditures, since crushing is feasible only at temperatures of below 800° C. The recovery of energy in cooling plate belt regions, or cooling roll regions, free of slag, thus, turns out to be extremely efficient.

The recovery of energy down to about 700° C. slag temperature in a single cooling step offers advantages both in terms of economic efficiency and in terms of quality.

The energy recovery of the process will be further enhanced if the waste heat of the slag strip on the throw-off end is recovered in a cooling shaft or a vibrochute.

Preliminary solidification may be avoided even in the event of possible standstills by aid of the heating means, in particular gas burners, arranged in the region of the distributing channels. Blast furnace slag tends to crystalline solidification with the glass portion substantially dropping during solidification, in particular, if the temperature of the blast furnace slag drops to temperatures of, for instance, below 1350° C. due to operating circumstances or if the analysis of the slag is not within the acidic range. An increase in the cooling speed as well as the optionally required addition of acidic additives into the intermediate storage allows for the adjustment of the most favourable conditions sought in each case in a simple manner also there.

On the whole, a structurally simple mode of operation capable of being controlled in a simple manner is provided, by which the desired glass portion and material flow rate can be optimized while keeping the load on the environment low. In particular, with the use of suitable starting materials exhibiting good vitrification properties, the process control according to the invention allows for an increase in the flow rate by increasing the layer thickness, to which end the controlle slag tap from the intermediate storage may be opened accordingly. In order to counteract short-term fluctuations and again lower the layer thickness in case of insufficient vitrification, it will simply do to increase the conveying speed of the cooling roll, or cooling plates, so as to provide for a smaller layer thickness and hence more rapid cooling with the material flow rate remaining the same. The stopper runoff of the intermediate storage in the first place enables coarse preadjustment and coarse regulation, fine regulation being ensured by the controllable speed of the plate belt.

As mentioned in the beginning, the process according to the invention may be realized by means of at least one cooling roll or a cooling plate belt, wherein the arrangement according to the invention advantageously is designed such that an intermediate storage for the liquid slag is provided, that the intermediate storage is followed by a distributing channel and that the distributing channel comprises a plurality of neighboring run-out or overflow means for delivering the melted slag onto the consecutively arranged cooling roll or cooling plates in parallel strands. It is only by providing an intermediate storage for the liquid slag that a continuous process is rendered feasible in a simple manner, since discontinuously tapped slag can be stored in that intermediate storage without heat losses. Due to the fact that a distributing channel is arranged to follow the intermediate storage and that the distributing channel comprises a plurality of neighboring run-out or overflow means for delivering the melted slag in parallel strands onto the consecutively arranged cooling roll or cooling plates, an extremely uniform application of the slag on the cooling roll, or on the cooling plate belt, has become feasible in a simple manner. Thus, an extremely slight slag layer thickness may be obtained at a relatively great width of the slag strip without the simultaneous occurrence of incrustations or premature slag cooling preventing a highly liquid distribution.

In a particularly advantageous manner, the arrangement is devised such that the distributing channel is pivotably arranged and, in a first pivoted position, is placeable into a run-out position in which parallel strands are applied onto the cooling roll or cooling plates and, in a further, opposed pivoted position, transfers the content of the distributing channel into a receptacle. This is of particular advantage if the arrangement must be shut down in case of emergency, since the slag flow may, thus, be conducted from the distributing channel into a receptacle and the slag will not uncontrolledly get onto the cooling roll or cooling plate belt, respectively, thereby enhancing the operating safety.

In a particularly advantageous manner, radiation plates for thermal shielding are arranged in the region of the free jet between the distributing channel and the cooling roll or cooling plates, respectively. Thus, premature cooling of the slag prior to its application on the cooling roll or cooling plate belt, which results in an uneven distribution of the slag on the cooling cylinder, or on the cooling plate belt, is avoided. In a simple manner, heat recovery from the cooling slag may be obtained in that plates for recovering the radiation heat are arranged over at least a portion of the circumference of the cooling roll, or along at least a portion of the path of the cooling plates, or of the cooling plate belt. With particular advantage, the arrangement according to the invention is devised such that counter plates or cooling plates and/or spraying nozzles for spraying a coolant are arranged in cooling plate belt regions, or cooling roll regions, free of slag. In addition to the heat release from the cooling roll, or cooling plate belt, by radiation or contact, cooling is reached which guarantees that the cooling roll, or cooling plate belt, in the region of slag charging exhibits the temperature difference relative to the slag required for slag cooling.

BRIEF DESCRIPTION OF THE DRAWINGS

In the following, the process will be explained in more detail by way of an exemplary embodiment schematically illustrated in the drawings. Therein.

DETAILED DESCRIPTION OF PREFERRED EMBODIMENTS OF THE INVENTION

Figure 1:
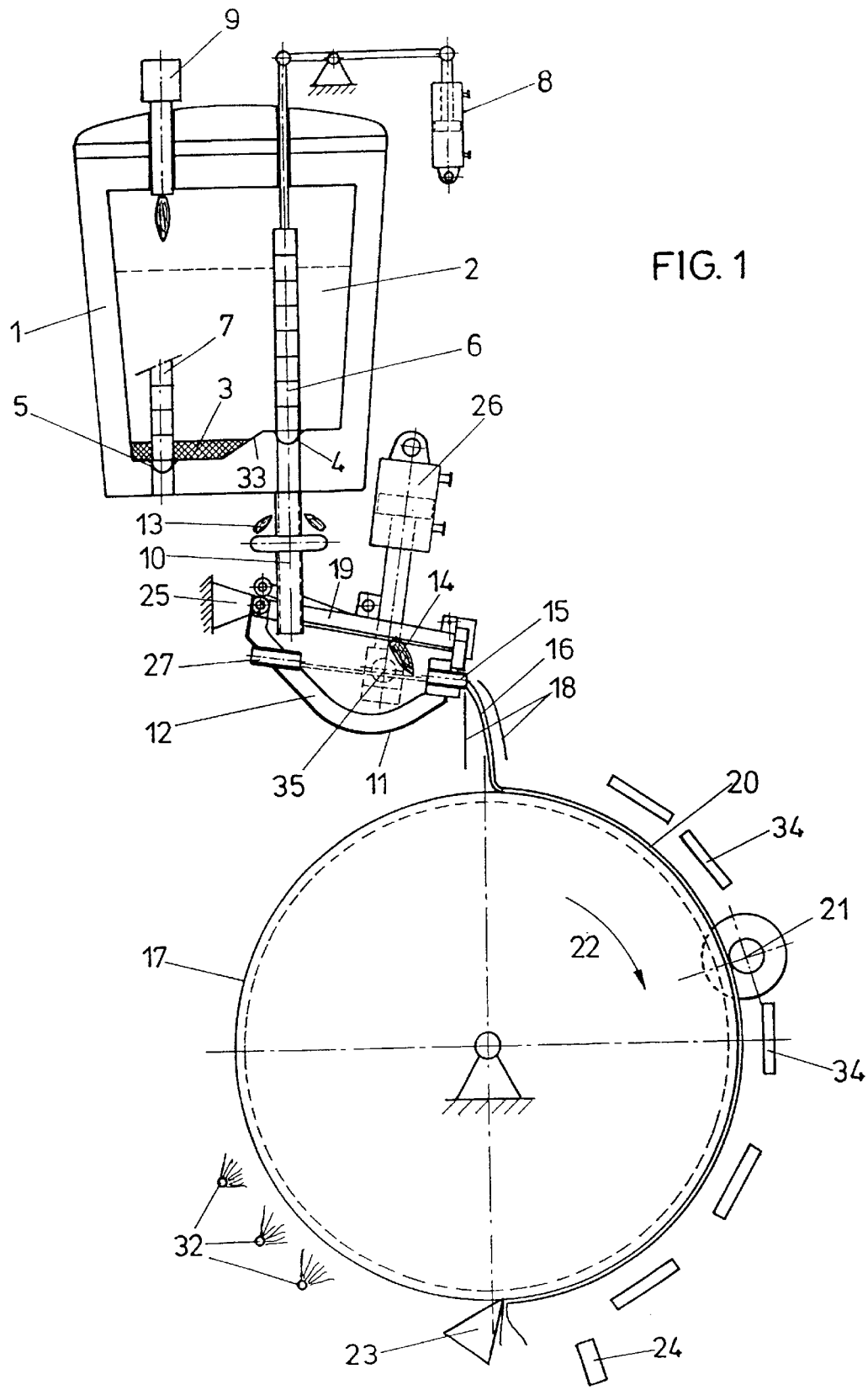
FIG. 1 illustrates an arrangement for continuously producing a glassy or vitrified blast furnace slag, in which the slag is applied onto a cooling roll.

In FIG. 1, an intermediate storage is denoted by 1, which is periodically charged with blast furnace slag 2 also containing residues of molten pig iron 3 through a supply duct not illustrated in detail. The intermediate storage has a depression 33 in which the molten pig iron 3 deposited may collect. Furthermore, the intermediate storage 1 is provided with a tap 4 for delivering slag 2 above the depression 33 and with a tap 5 for discharging molten pig iron 3 within the depression 33. The taps 4 and 5 may be closed with stoppers 6 and 7, the removal of the slag 2 being effected via the stopper 6 controlled by a stopper control 8 and the stopper control 8 being tuned to further slag processing. Molten pig iron 3 may be drawn off the intermediate storage 1 via the tap 5 by lifting the stopper 7. Acidic additives may be charged into the intermediate storage 1 as a function of the slag analysis in order to adjust the desired slag basicity. The intermediate storage 1 is provided with a burner 9 for preheating the intermediate storage prior to filling in the slag 2 and for maintaining the slag temperature during operation of the arrangement. The blast furnace slag 2 drawn off through the tap 4, via a horizontal or vertical intermediate tube 10, gets on a distributing channel 11 provided with a refractory lining 12. The intermediate tube 10 as well as the distributing channel 11 are provided with burners 13, 14 in order to maintain the temperature of the slag. The burner 13 provided on the intermediate tube 10 is designed as an annular burner, preventing "freezing" of the stopper 6 even during an operating standstill. On account of its trough-shaped design, the distributing channel 11 has a storage capacity compensating for turbulences which may result from the slag 2 flowing in through the intermediate tube. On its run-out side, the distributing channel 11 comprises several outflow tubes 15 so as to deliver small slag streams 16 onto the cooling roll 17 arranged therebelow at a short distance. In order to safeguard the high liquidity of the slag and prevent premature cooling of the slag, radiation plates 18 are arranged in the region of the free slag streams 16 in order to reduce heat losses. Moreover, the distributing channel is provided with an insulating lid 19. As the slag streams 16 impinge on the cooling roll, they flow apart uniting to an accordingly wide slag strip 20 in a uniformly thin layer. This thin layer solidifies very quickly due to the heat released to the cooling roll 17 and by radiation, whereupon the layer thickness is measured by means of a sensing wheel 21. The measured value of the layer thickness serves as a controlled variable for the stopper control 8. Radiation panels 34 are arranged along the cooling roll 17, by which at least a portion of the radiation heat of the slag strip 20 can be recovered. When moving in the sense of arrow 22, the slag cools further by giving off heat to the cooling roll 17, wherein the heat removed by internal cooling is utilized by a steam boiler system not illustrated in detail. The glassy or vitrified slag is separated from the cooling roll 17 by a scraping device 23 and fractionated in a crusher not illustrated in detail. The residual slag heat may be recovered after crushing. In order to detect whether the blast furnace slag has the desired glassy or vitrified structure at the throw-off, an optical measuring device 24 is provided, cooperating with the actuation control of the cooling roll 17 and the closure control of the stopper runoff 8 on the intermediate storage 1. An additional measured variable for controlling the amount of slag to withdraw is the slag thickness measured by the thickness gauge 21 on the way to the throw-off, as already mentioned above. In the regions free of slag, the cooling roll may be cooled by a coolant sprayed thereon via spraying nozzles 32.

The distributing channel is pivotably mounted on a bearing 25 and may be lifted and lowered by means of a cylinder piston aggregate 26 articulately connected with the distributing channel 11 on a bearing eye 35. During an operating standstill the distributing channel 11, thus, may be lowered by such an extent that the total content of the distributing channel 11 gets over the run-out tubes 15 and the distributing channel 11 may, thus, be emptied. In addition, it is possible in case of a sudden operation shut-down required, for instance, in an emergency event, to lift the distributing channel 11 by means of the cylinder piston aggregate 26 in a manner that the slag flow will be conducted not through the run-out tube 15, but through run-out tubes 27 and the slag will be transferred into a receptacle not illustrated in detail.

Figure 2:
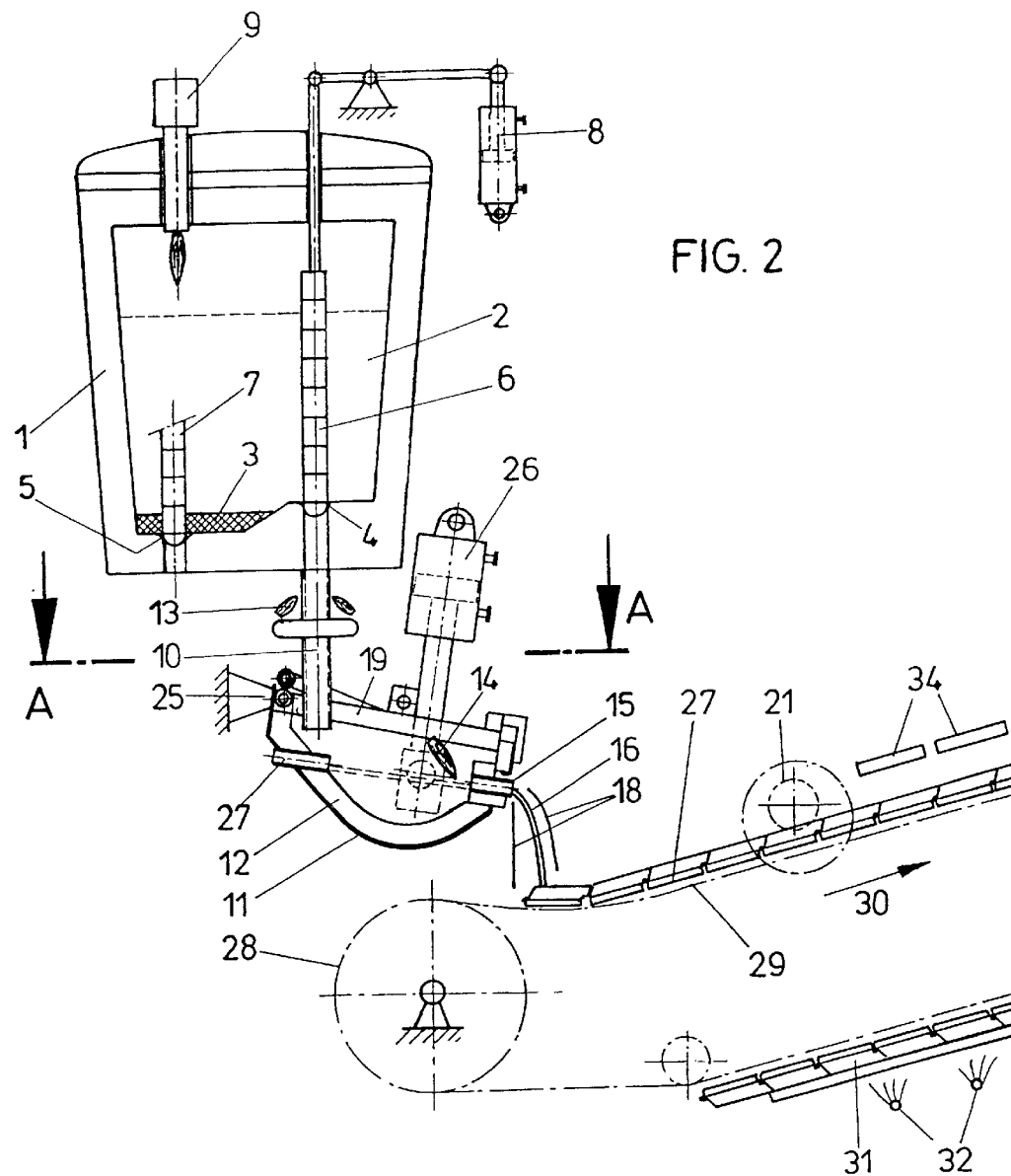
FIG. 2 illustrates an arrangement for continuously producing a glassy or vitrified blast furnace slag, in which the slag is applied onto a cooling plate belt.

In the illustration according to FIG. 2, the reference numerals of the similarly designed embodiment according to FIG. 1 have been retained for identical structural components. Also in this embodiment, the slag 2 is conducted from an intermediate storage 1 via an intermediate tube 3 into a distributing channel 11, from where the slag via several overflow tubes 15 in partial streams gets onto cooling plates 27 attached to an endless conveyor belt 29 circulating via deflection pulleys 28. While moving in the sense of arrow 30, the slag is being cooled and, as already described in FIG. 1, in the glassy or vitrified state is separated from the conveyor belt by means of a scraping device not illustrated in detail on the conveyor belt end. After inversion of the direction, the empty cooling plates 31 also may be cooled by spraying means 32 arranged along the return run.

Figure 3:
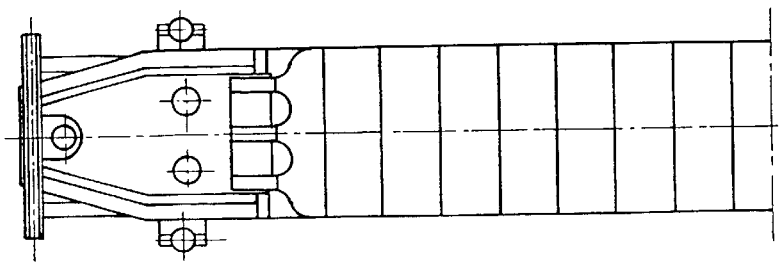
FIG. 3 is a section along line A—A through the arrangement depicted in FIG. 2.

From FIG. 3 a section A—A through the embodiment represented in FIG. 2 is apparent with the reference numerals having been taken over from FIG. 2.

What is claimed is:

1. A process for continuously producing a glassy or vitrified blast furnace slag, comprising:
    supplying liquid slag to an intermediate storage;
    removing the liquid slag from the intermediate storage and applying the liquid slag via a distributing channel, in parallel strands, onto a cooling roll, or onto articulated interlinked cooling plates conducted as an endless conveyor belt over deflection pulleys, for drying;
    heating the distributing channel by at least one heating element directed to an outlet opening near an internal run-off edge so as to maintain the liquid slag at a temperature above 1350° C. as it is applied onto the cooling roll or the cooling plates; and
    removing dried slag from the cooling roll or the cooling plates for comminution or granulation by a crusher.

2. A process according to 1, wherein sedimented pig iron is drawn off the intermediate storage via a tap arranged below a slag tap.

3. A process according to claim 1, wherein the distributing channel comprises a plurality of neighboring flow directing means for delivering the liquid slag onto the cooling roll or cooling plates in said parallel strands.

4. A process according to claim 3, wherein the distributing channel is pivotally arranged to move between a first pivoted position in which said parallel strands are applied onto the cooling roll or cooling plates and a second pivoted position in which liquid slag in the distributing channel is transferred into a receptacle.

5. A process according to claim 3 wherein radiation sheets for thermal shielding are arranged in a region of said parallel strands between the distributing channel and the cooling roll or cooling plates.

6. A process according to claim 3, wherein plates for recovering radiation heat of the liquid slag are arranged over at least a portion of the circumference of the cooling roll, or along at least a portion of the cooling plates.

7. A process according to claim 3, wherein nozzles for spraying a coolant are arranged adjacent the cooling roll or cooling plates in regions free of dried slag.

8. A process according to claim 1, wherein heating the distributing channel maintains the liquid slag at substantially 1400° C.

9. A process according to claim 1, wherein liquid slag applied onto the cooling roll or cooling plates: forms a layer which is adjusted to a thickness of 1 to 15 mm; cools by at least 300° C. at a cooling speed of above 10° C./s; and is removed as dried slag at a temperature above 600° C.

10. A process according to claim 9, wherein said layer has a thickness adjusted to 2 to 10 mm.

11. A process according to claim 1, wherein adjacent ones of said strands are spaced apart less than 300 mm.

12. A process according to claim 11, wherein adjacent ones of said strands are spaced apart between 100 to 200 mm.

13. A process according to claim 1, wherein the liquid slag applied from said intermediate storage forms a layer on the cooling roll or cooling plates, and wherein said intermediate storage includes a slag tap and an associated stopper runoff which is controlled as a function of the thickness of said layer to regulate the amount of liquid slag discharged from the intermediate storage through the slag tap for application to the cooling roll or cooling plates.

14. A process according to claim 1, wherein the conveying speed of the cooling roll or cooling plates and/or discharge of liquid slag through a slag tap in the immediate storage is controlled as a function of a value measured representative of a state of vitrification of the dried slag removed from the cooling roll or cooling plates.

15. A process according to claim 14, wherein the state of vitrification of the dried slag is detected by an optical sensor which determines transmission and/or reflection characteristics of the dried slag as it is removed from the cooling roll or cooling plates.

16. An arrangement for continuously producing a glassy or vitrified blast furnace slag, comprising:
    an intermediate storage for receiving liquid slag;
    a distributing channel having a plurality of neighboring flow directing means for delivering said liquid slag from said intermediate storage in parallel strands onto a rotating cooling roll or articulated interlinked cooling plates formed as an endless conveyor belt which passes over deflection pulleys;

at least one heater element positioned adjacent the distributing channel for maintaining the liquid slag at a temperature above 1350° C. as it is delivered by the distributing channel onto the cooling roll or cooling plates; and means for removing from the cooling roll or cooling plates slag which is dried by said roll or plates and delivering the dried slag to a crusher for comminution or granulation.

17. An arrangement according to claim 16, wherein the distributing channel is pivotally mounted to move between a first position in which said parallel strands are delivered onto the cooling roll or cooling plates and a second position in which said liquid slag is delivered from the distributing channel into a receptacle, the arrangement further comprising:

means for selectively positioning the distributing channel in said first and second positions.

18. An arrangement according to claim 16, further comprising:

radiation sheets for thermal shielding arranged in a region of said parallel strands between the distributing channel and the cooling roll or cooling plates.

19. An arrangement according to claim 16, further comprising:

plates for recovering radiation heat of the liquid slag, said plates being arranged over at least a portion of the cooling roll or along at least a portion of the cooling plates.

20. An arrangement according to claim 16, further comprising:

a plurality of nozzles for spraying a coolant arranged adjacent the cooling roll or cooling plates.

21. An arrangement according to claim 16, further comprising:

a slag tap provided in the intermediate storage for supplying liquid slag to the distributing channel; and a further tap provided in the intermediate storage and positioned below the slag tap for drawing off sedimented pig iron from the intermediate storage.

22. An arrangement according to claim 21, further comprising:

a stopper runoff associated with the slag tap; and means for controlling the stopper runoff to regulate the amount of liquid slag delivered to the distributing channel through the slag tap.

23. An arrangement according to claim 22, wherein said control means regulation is a function of the thickness of the liquid slag on the cooling roll or cooling plates.

24. An arrangement according to claim 22, wherein said control means is a function of a measured value representative of a state of vitrification of dried slag removed from the cooling roll or cooling plates.

25. An arrangement according to claim 24, wherein the state of vitrification of the dried slag is detected by an optical sensor which determines transmission and/or reflection characteristics of the dried slag.

26. An arrangement according to claim 16, further comprising:

means for controlling the speed of the cooling roll or cooling plates as a function of a measured value representative of a state of vitrification of dried slag removed from the cooling roll or cooling plates.

27. An arrangement according to claim 26, wherein the state of vitrification of the dried slag is detected by an optical sensor which determines transmission and/or reflection characteristics of the dried slag.

* * * * *